United States Patent [19]

Blakeslee

[11] 4,160,488

[45] Jul. 10, 1979

[54] EXTENDED WIDTH SENSOR

[75] Inventor: Thomas R. Blakeslee, Woodside, Calif.

[73] Assignee: Logisticon, Inc., Sunnyvale, Calif.

[21] Appl. No.: 840,643

[22] Filed: Oct. 11, 1977

[51] Int. Cl.$^2$ ............................................. B62D 1/28
[52] U.S. Cl. .................................. 180/168; 318/587; 318/615; 318/681; 330/138; 330/280
[58] Field of Search ................. 180/98; 318/580, 587, 318/611, 615, 619, 681; 330/138, 280

[56] References Cited

U.S. PATENT DOCUMENTS

| | | | |
|---|---|---|---|
| 3,498,403 | 3/1970 | Kohls | 180/98 |
| 3,720,281 | 3/1973 | Frownfelter | 180/98 |
| 3,935,922 | 2/1976 | Cooper | 180/98 |
| 4,003,445 | 1/1977 | DeBruine | 180/98 |
| 4,040,500 | 8/1977 | Blakeslee | 180/98 |
| 4,043,418 | 8/1977 | Blakeslee | 180/98 |

*Primary Examiner*—John P. Silverstrim
*Attorney, Agent, or Firm*—Limbach, Limbach & Sutton

[57] ABSTRACT

The effective sensor width of a path following vehicle guidance system is enlarged by having a first gain control amplifier for amplifying the sum of the path sensor signals, a second gain control amplifier for amplifying the difference of the path sensor signals and a third amplifier, in tandem with the second amplifier for amplifying the output of the second amplifier once the second amplifier's output has peaked out. All three amplifiers are gain-controlled by the same negative feedback signal. The outputs of the first and third amplifiers are synchronously detected to provide an error signal for an electromechanical steering servo for the vehicle.

7 Claims, 3 Drawing Figures

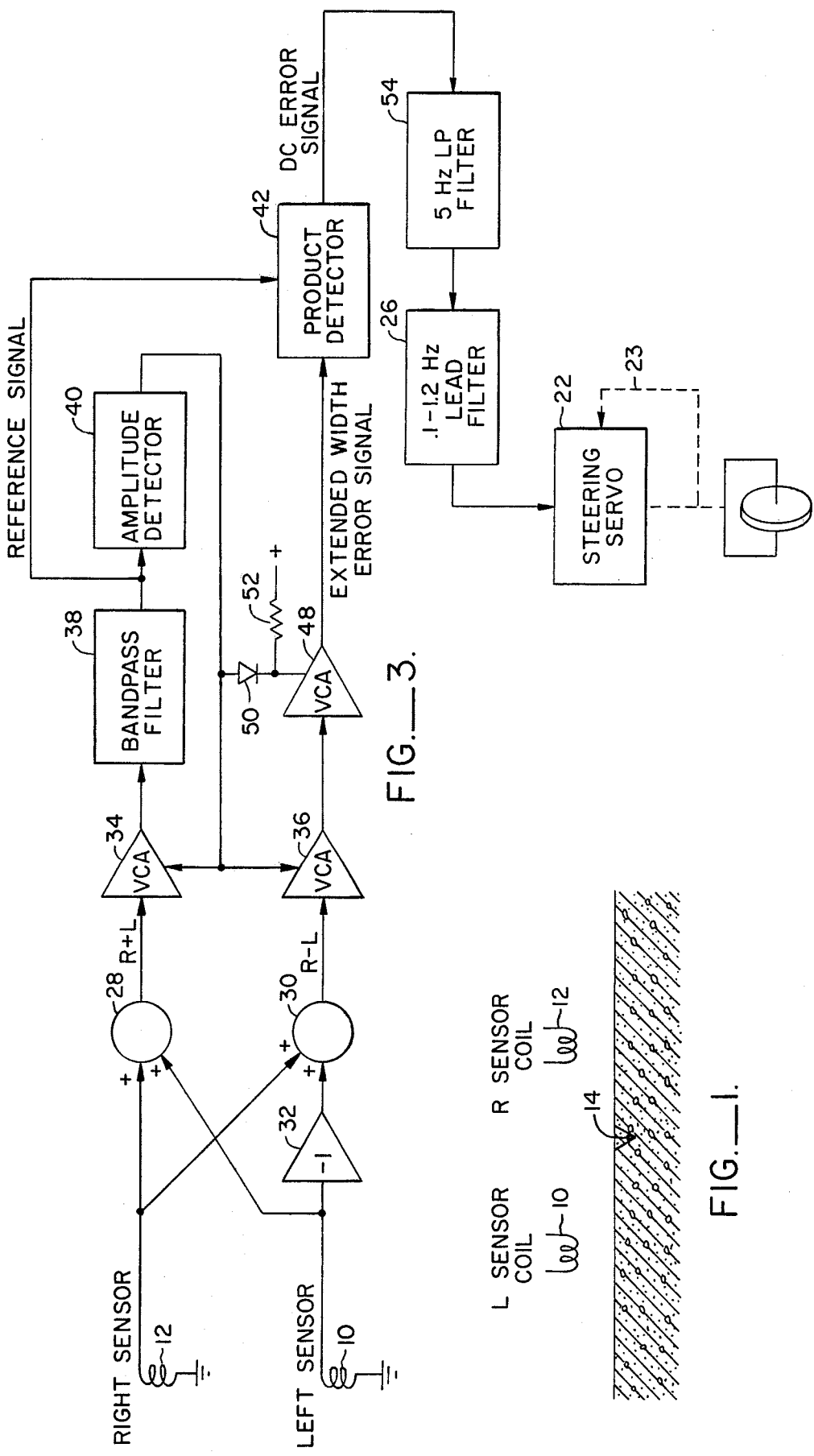

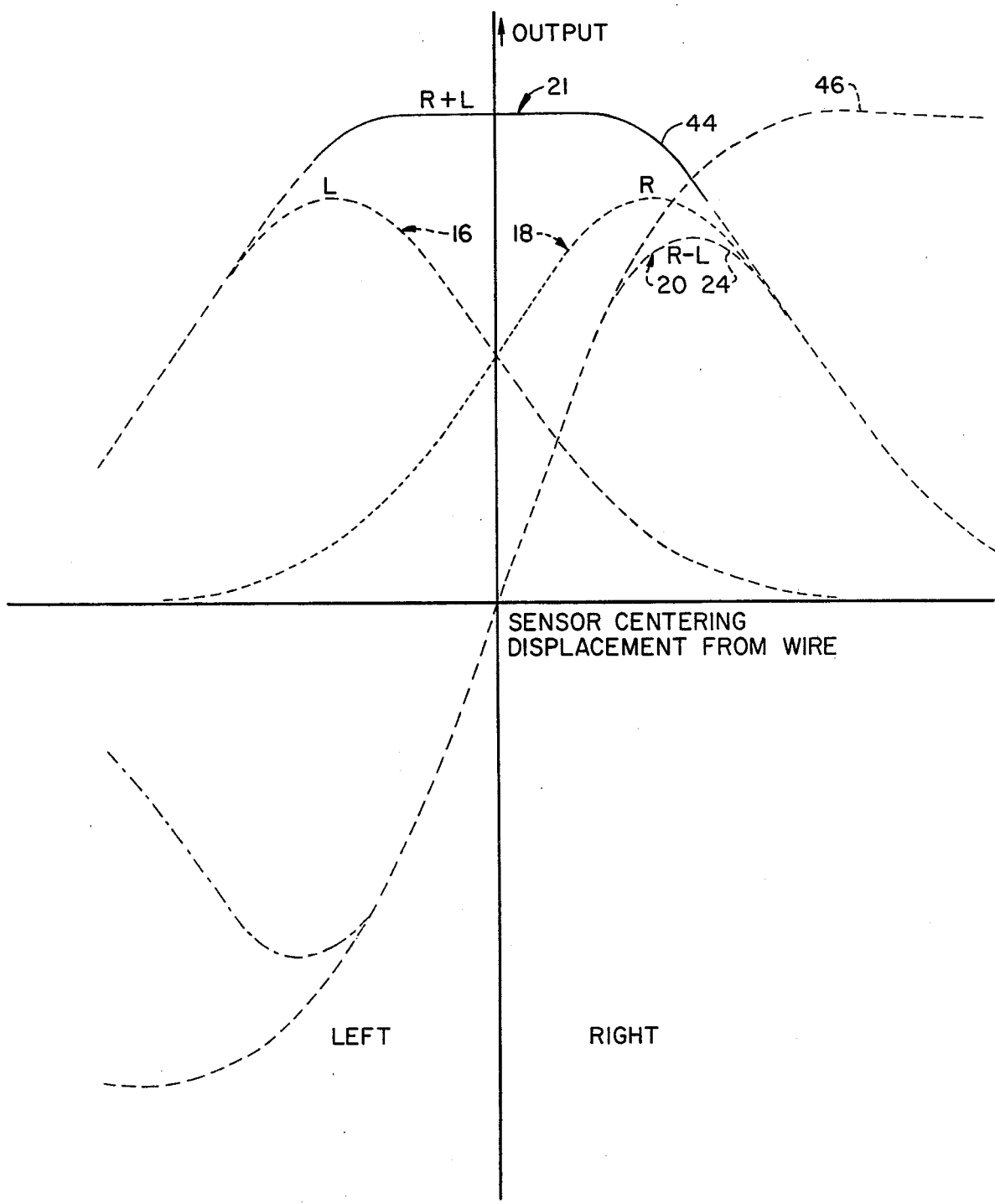
FIG._2.

EXTENDED WIDTH SENSOR

CROSS-REFERENCE TO RELATED PATENT

This application is related to the applicant's U.S. Pat. No. 4,040,500, issued Aug. 9, 1977, for GUIDANCE SYSTEM FOR LIFT TRUCK. The disclosure of that patent is to be considered as incorporated herein by reference for the purpose of disclosing the basic system within which the present invention is intended to operate. Particular attention is directed to the FIGS. 1 and 9–12 of that application.

BACKGROUND OF THE INVENTION

This invention relates to guidance devices for self-powered vehicles and more particularly to an improvement for a magnetic wire-following guidance system for a vehicle.

In designing an electronic vehicle guidance system which follow an energized wire buried in the floor, the conventional approach is to use two sensor coils mounted on the vehicle and which normally straddle the buried wire. An alternating current in the buried wire induces voltages in the sensing coils which varies with the spacing of the vehicle center from the buried wire. The difference between the sensor coil signals gives a linear indication of the vehicle centering error which is used to control an electromechanical steering mechanism to keep the vehicle centered over the wire. Such a system is disclosed in the applicant's U.S. Pat. No. 4,040,500 mentioned above.

When the amount of centering error is greater than half of the spacing between the sensors, the output from the sensors starts to decrease with increasing centering error. Since lead networks needed for servo stabilization make the steering correction highly sensitive to the rate of change of error, this incorrect slope causes the steering mechanism to correct in the wrong direction. For example, at a certain distance from the buried wire, the slope of the rate of change of the sensor signals indicates a decreasing error signal even though the vehicle is actually moving away from the wire. Normally, the sensor signals would give a decreasing error signal when the vehicle was moving towards the wire. It should be noted that the error signal in question is the difference between the two sensor outputs. When the vehicle is beyond a certain predetermined distance from the wire the guidance system may actually cause a steering correction in the wrong direction because of the negative slope of the rate of change of the error signals.

In the applicant's guidance system as described in the aforementioned patent, the vehicle can be manually steered over the buried wire and then control can be relinquished by the opertor to the automatic guidance system. In such a system the width of the linear sensor characteristic is particularly important since the vehicle will naturally overshoot the wire somewhat during the transition between manual and automatic control. If the overshoot is more than half of the sensor spacing, the reverse slope area of the sensor characteristic will be entered and the vehicle will steer itself off of the wire. If the sensor characteristic is widened by simply increasing the spacing between the sensors, the guidance accuracy suffers because the signal ouput of the sensors is greatly reduced when the vehicle is centered over the wire. The linearity of the sensor characteristics and the signal-to-noise ratio also suffer when the spacing between the sensors is increased.

SUMMARY OF THE INVENTION

The problem of extending the sensor width without reducing the sensor accuracy is overcome by the present invention of a simple electronic means of processing the sensor output signal to give a linear sensing characteristic twice as wide as the sensor itself. The applicant's invention is intended as a modification of a vehicle-mounted guidance system of the type having a pair of vehicle-mounted sensors which normally straddle a detectable guide path and produce separate error signals representative of the spacing of the sensors from the guide path and electromechanical steering means for guiding the vehicle along the guide path in response to the error signals. The improvement of the invention comprises first gain-controlled amplifying means for amplifying the sum of the sensor error signals and second gain-controlled amplifying means for amplifying the difference of the sensor error signals. The second amplifying means has two separately gain-controlled stages of amplification in tandem. The first stage is gain-controlled in parallel with the first amplifying means. The second stage is gain-controlled in parallel with the first amplifying means only after the output of the first stage of the second amplifying means has peaked out. This leveling off is detected by comparing the amplitude of the negative feedback signal used in contrölling the gain of the first and second amplifying means and applying that negative feedback signal to the second stage of the second amplifying means only when the negative feedback signal exceeds a certain predetermined magnitude. The predetermined magnitude of the negative feedback signal is empirically chosen to correspond to the condition that the output signal of the first stage of the second amplifier has started to level off. The electromechanical steering means is supplied with the outputs of the first and second amplifying means.

In the preferred embodiment, these two outputs are synchronously detected to produce a single, direct current error signal whose magnitude represents the distance of the vehicle from the guide path and whose polarity indicates on which side of the guide path the vehicle is positioned.

It is therefore an object of the present invention to modify a guide path vehicle guidance system so that for a given usable sensor width it is possible to have the sensors closer together and therefore achieve better guidance due to improved signal-to-noise ratio when the sensors are centered over the guidance wire.

It is another object of the invention to provide an electronic modification of a conventional guidance means for processing the sensor output signals to give a linear sensing characteristic which is twice as wide as the actual spacing between the sensors.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a vertical, sectional view of a portion of the buried wire guide path of the system of the invention;

FIG. 2 is a waveform diagram of the sensor coil output and the outputs of the various amplifying stages of the guidance system of the invention; and FIG. 3 is a schematic block diagram of the electronic control of the guidance system of the invention.

DESCRIPTION OF THE PREFERRED EMBODIMENT

Referring now more particularly to FIGS. 1 and 2, in the guidance system of the invention a pair of left and right sensor coils 10 and 12 are mounted on the body of the vehicle to be guided (not shown) and are spaced apart from each other so that they normally straddle a buried, energized wire 14 which resides in the floor on which the vehicle is maneuvered. An alternating current in the guide wire 14 induces voltages in the sensing coils 10 and 12 which vary in magnitude with the vehicle centering error as shown in FIG. 2 at curves 16 and 18, respectively. The difference between the signals from the two sensors (R−L) is shown at curve 20. As is illustrated, the curve 20 gives a linear indication of the vehicle centering error and this indication is used to control the electromechanical steering mechanism (shown in block form in FIG. 3 as element 22) to keep the vehicle centered over the guide wire 14.

When an amount of actual centering error is greater than half of the spacing between the sensors 10 and 12, the R−L output starts to decrease with increasing centering error as shown at point 24 on curve 20. The lead network 26 which receives the error signal prior to the steering servo 22 is highly sensitive to the rate of change of the error signal so that this incorrect slope at point 24 would normally cause steering correction in the wrong direction. Thus, if the vehicle is sufficiently far away from the buried wire 14 and is moving away from it, the slope at point 24 gives a decreasing error signal just as though the vehicle was moving toward the wire 14. This will ordinarily cause a steering correction in the wrong direction, i.e., away from the wire 14.

Referring now more particularly to FIG. 3, a block diagram of the electronic circuit for the guidance system of the invention is illustrated. The output of the sensor coil 12 is supplied to one input of a summing junction 28 and one input of a summing junction 30. The output of the left sensor coil 10 is supplied to another input of the summing junction 28 and one input of a summing junction 30. The output of the left sensor coil 10 is supplied to another input of the summing junction 28 and, through an inverting amplifier 32 to another input of the summing junction 30. The R+L output of the summing junction 28 is supplied to the input of a first voltage controlled amplifier 34. The R−L output of the summing junction 30 is supplied to the input of a second voltage controlled amplifier 36.

The amplified R+L output of the voltage controlled amplifier 34 is fed through a 6.3 KHz band pass filter 38 which is tuned to a 6.3 KHz line driver (not shown) which energizes the buried wire 14. The output from the band pass filter 38 is fed to the input of an amplitude detector 40. The output of the amplitude detector is connected back to the gain control input of the amplifier 34 so that a negative feedback loop is formed to adjust the gain of the amplifier 34 to produce a steady state, constant amplitude reference signal output at the output of the band pass filter 38. This reference signal output is supplied to one input of a synchronous detector 42. The gain of the amplifier 34 is thus increased as the sensors are moved further off center. Referring again to FIG. 2, a portion of the drop-off of the R+L signal 21 is designated at point 44 on the curve.

Because the voltage controlled amplifier 36 is receiving the same negative feedback signal as the amplifier 34, the gain of the difference signal amplification is also increased. When the sensors are far off center, the signals from one of the coils tends to dominate both the R+L and the R−L signals. The identical voltage controlled amplifier 36 therefore produces a constant amplified R−L output 46 as the sensors are moved further from being centered over the wire. It should be noted that the rate of change in the decrease of the R−L signal as indicated at point 24 (FIG. 2) is exactly matched by the rate of increase of the gain of the amplifier 36 so that the net output from the amplifier 36, as shown on the curve at point 46 in FIG. 2, is of a substantially constant amplitude.

The output of the amplifier 36 is supplied to the input of a third voltage controlled amplifier 48 whose output is supplied to the other input of the synchronous detector 42. The negative feedback signal from the amplitude detector 40 is also supplied to the voltage controlled amplifier 48, however, it is not supplied to the amplifier 48 until the negative feedback signal has reached a certain predetermined magnitude. The gain control input of the amplifier 48 is connected to the cathode of a diode 50. The anode of the diode 50 is connected to the output of the amplitude detector 40. The cathode of the diode 50 is also connected through a resistance 52 to a positive bias voltage source. This bias voltage magnitude is empirically determined to match the magnitude of the negative feedback signal when the output of the amplifier 36 reaches the curve point 46 as shown in FIG. 2. With this circuit arrangement, the diode 50 will be reverse biased until the amplifier 36 has "peaked out." When that happens, the voltage controlled amplifier 48 will receive the negative feedback gain control signal and will begin increasing the difference signal gain further as the level of the R+L signal continues to fall with increasing displacement from the energized wire. The constant amplitude R−L output of the amplifier 35 is thus changed into an increasing amplitude signal which continues to increase with increasing sensor displacement well beyond the normal usable width range of the sensor. Thus, by having two gain-controlled stages of amplification in tandem, the effective width of the sensors is electronically increased without the necessity of physically increasing the separation btween the sensors.

The output of the synchronous detector 42 is fed through a 5 Hz low pass filter 54 to filter out any high frequency pulses and the output of the filter 54 is fed to a 0.1-1.2 Hz lead filter 26 which introduces an approximately 60° lead-in phase to prevent oscillation in the feedback loop. The output of the lead filter is fed to the electromechanical steering servo 22 which includes its own mechanical feedback arrangement of the conventional type. Such an arrangement is disclosed in detail in the applicant's U.S. Pat. No. 4,040,500 at FIG. 9.

While the extended sensor width modification of the invention has been described above for use with the applicant's guidance system as described in his U.S. Pat. No. 4,040,500, it can be used with other, less preferred systems. Thus, for example, in some systems the sensor signals are simply amplified separately and are applied differently across a reversible steering motor. The separate sensor signal amplifiers are gain-controlled by a negative signal which is proportional to the sum of the amplified error signals.

Such systems can be modified for extended sensor width according to the applicant's invention by providing each of the sensor signal amplifiers with two, separately gain-controlled amplifying stages in tandem. The first stage is gain-controlled in the conventional matter by the negative feedback signal. The second stage is gain-controlled with the negative feedback signal only after the feedback signal exceeds a predetermined magnitude, which magnitude is empirically selected to correspond to the condition that the output of the first stage has peaked out. The circuitry for applying the feedback signal to the second stage is the same as that shown in FIG. 3, i.e., a diode which is reverse-biased so as to be conductive only when the magnitude of the feedback signal exceeds the reverse bias voltage.

While the above described embodiments have all been with reference to a buried, energized wire system, it should be apparent that the present invention is equally adaptable to any sort of path following guidance system such as, for example, a photoelectric sensor type guidance system. Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improvement for extending the control width of an automatic guidance system for steering a vehicle along a guide path, the guidance system being of the type having vehicle mounted left and right sensors for producing left and right error signals, respectively, which are proportional to the distance of the sensors from the guide path and electromechanical steering means supplied with the error signals for steering the vehicle along the guide path in response to the error signals, wherein the improvement comprises first, second and third amplifiers each having separate signal inputs and outputs and gain control inputs, means for combining the error signals to produce a sum signal which is supplied to the input of the first amplifier, means for subtracting one error signal from the other to produce a difference signal which is supplied to the input of the second amplifier, the output of the second amplifier being connected to the input of the third amplifier, means connected to the output of the first amplifier for generating a negative feedback gain control signal which is supplied to the first and second amplifiers, the negative feedback signal causing the first amplifier to have a gain such that the steady state output of the first amplifier has a susbstantially constant amplitude, extended sensor width means for supplying the negative feedback signal to control the gain of the third amplifier only after the negative feedback signal exceeds a predetermined magnitude, and synchronous detecting means connected to the outputs of the first and third amplifiers for producing a direct current electromechanical steering means control signal whose magnitude represents the distance of the vehicle from the guide path and whose polarity indicates on which side of the guide path the vehicle is positioned.

2. An improved vehicle guidance system as recited in claim 1 wherein the negative feedback means includes an amplitude detector.

3. An improved vehicle guidance system as recited in claim 1 wherein the predetermined magnitude at which the negative feedback signal is supplied to the third amplifier is chosen to correspond to the condition that the output signal of the second amplifier is substantially constant.

4. An improved vehicle guidance system as recited in claim 1 wherein the extended sensor width means comprises a diode connected in series with the negative feedback means and the third amplifier gain control input and a reference voltage source for reverse biasing the diode with a voltage of the predetermined magnitude.

5. An improvement for extending the steering width of a vehicle mounted guidance system of the type having a pair of vehicle mounted sensors which normally straddle a detectable guide path and produce separate error signals representative of the spacing of the sensors from the guide path and electromechanical steering means for guiding the vehicle along the guide path in response to the error signals, wherein the improvement comprises:

gain controlled amplifying means for amplifying the error signals, the amplifying means including two, separately gain controlled stages of amplification in series and negative feedback means for generating a feedback gain control signal which is supplied directly to the first stage and which causes the steady state output of the first stage to have a constant amplitude, and means for supplying the feedback signal to gain control the second stage only after the feedback signal exceeds a predetermined magnitude.

6. An improvement for a vehicle guidance system as recited in claim 5, wherein the amplifying means amplify the difference of the error signals.

7. An improvement for extending the control width of an automatic guidance system for steering a vehicle along an energized wire, the guidance system being of the type having sensing means for sensing the vehicle's deviation from the wire and for producing an error signal proportional to such deviation and electromechanical means supplied with the error signal for steering the vehicle along the wire in response to the error signal, wherein the improvement resides in the sensing means which comprise:

a pair of sensors mounted on the vehicle and spaced apart transversely with respect to the direction of vehicle travel, each sensor producing a separate output proportional to its distance from the wire, means for summing the sensor error signals to produce an error sum signal, means for taking the difference of the error signals to produce an error difference signal, first variable gain amplifying means for amplifying the sum signal, second variable gain amplifying means for amplifying the error difference signal, negative feedback means supplied with the amplified error sum signal for producing a negative feedback signal to control the gain of the first variable gain amplifying means so as to produce a steady state constant amplitude reference signal at the output of the first variable gain amplifying means, the negative feedback signal also being supplied to the second variable gain amplifying means to control its gain, third variable gain amplifying means for amplifying the output of the second variable gain amplifying means, means for supplying the negative feedback signal to vary the gain of the third variable gain amplifying means only after the negative feedback signal exceeds a predetermined magnitude, which is empirically selected to coincide with the condition that the output of the second amplifying means has peaked out, and means connected to the outputs of the first and third amplifying means for generating said error signal for the electromechanical steering means.

* * * * *